United States Patent
Shukla

(10) Patent No.: US 11,879,561 B2
(45) Date of Patent: Jan. 23, 2024

(54) VALVE SETUP FOR SMB CHROMATOGRAPHY

(71) Applicant: Sartorius Stedim Chromatography Systems Ltd., Royston (GB)

(72) Inventor: Dinesh Shukla, Bolton, MA (US)

(73) Assignee: Sartorius Stedim Chromatography Systems Ltd., Royston (GB)

( * ) Notice: Subject to any disclaimer, the term of this patent is extended or adjusted under 35 U.S.C. 154(b) by 0 days.

(21) Appl. No.: 17/749,928

(22) Filed: May 20, 2022

(65) Prior Publication Data

US 2023/0375101 A1    Nov. 23, 2023

(51) Int. Cl.
*B01D 15/18*    (2006.01)
*F16K 27/12*    (2006.01)
*F16K 27/02*    (2006.01)

(52) U.S. Cl.
CPC .......... *F16K 27/12* (2013.01); *B01D 15/1842* (2013.01); *F16K 27/029* (2013.01); *F16K 27/0236* (2013.01)

(58) Field of Classification Search
CPC .............. B01D 15/10; B01D 15/1842; B01D 2201/30; B01D 2201/301; B01D 2201/305; B30B 1/003; B30B 5/02; F16K 7/17; F16K 27/00; F16K 27/02; F16K 27/0236; F16K 27/0281; F16K 27/029; F16K 27/12; F16K 99/0015; F16K 99/0028; F16K 99/0059; F16K 2200/50; F16K 2200/501; F16K 2200/502; F16K 27/003; G01N 30/6091

USPC .............. 100/269.01, 269.04; 137/223, 231, 137/234.5, 255, 259, 262, 263, 265, 266, 137/597

See application file for complete search history.

(56) References Cited

U.S. PATENT DOCUMENTS

| | | | |
|---|---|---|---|
| 3,771,438 A * | 11/1973 | Radakovich | B29C 43/08 100/223 |
| 2012/0261538 A1* | 10/2012 | Keizer | F16K 7/06 248/313 |
| 2023/0078364 A1* | 3/2023 | Shukla | F16K 27/0209 |

* cited by examiner

*Primary Examiner* — Kevin F Murphy
*Assistant Examiner* — Jonathan J Waddy
(74) *Attorney, Agent, or Firm* — Quinn IP Law

(57) ABSTRACT

A valve setup for SMB chromatography includes a cassette block, a control block, a swiveling door, and a flexible pressurizing tube. The cassette block is configured to control each of a plurality of valves when an operation surface is in close contact with a control surface of the cassette block. The swiveling door is hinged to the valve control block such that an open state of the door arranges the cassette block such that the control surface is at the operation surface of the control block, and a closed position holds the cassette block with an inner surface of the swiveling door abutting a rear surface of the cassette block opposite the control surface. The flexible pressurizing tube is arranged at the inner surface of the swiveling door so the pressurizing tube presses against the rear surface of the cassette block when the pressure in the tube is increased.

12 Claims, 9 Drawing Sheets

VALVE SETUP FOR SMB CHROMATOGRAPHY

BACKGROUND

Biopharmaceutical or pharmaceutical production involves the purification of solutions from which active pharmaceutical ingredients (API) are extracted. These solutions, also known as feeds, can be produced chemically-synthetically or biologically-organically. The feed comprises a plurality of components that need to be separated from each other, e.g. one or more target components and impurities. Chromatography is a technique used to perform this separation process.

One implementation of chromatography for separating two components is the simulated moving bed (SMB). An SMB system comprises a plurality of columns that are connected to a valve switching system. The valve system controls fluid delivery to the plurality of columns by corresponding column inlets and outlets.

The BioSMB systems by Sartorius for SMB chromatography include a valve setup comprising two separate blocks: a valve control block that regulates the switching of the valves and a valve cassette block that comprises the plurality of valves. The valve cassette block is the only component that comes in contact with the fluids, and can be conveniently replaced after every use in order to avoid a cumbersome cleaning process.

The connection between the valve control block and the valve cassette block needs to be airtight. Conventionally, the valve cassette block is pressed against the valve control block using a plurality of screws and washers tightened in a predetermined sequence, e.g. first at 2 Nm and then at 3.5 Nm. This procedure requires a calibrated torque wrench and a long installation time (about 45 minutes).

Another conventional method for securing the valve cassette block to the valve control block is the use of a hydraulic pressurizing door, which applies the required sealing pressure. The hydraulic pressurizing door is quite heavy, bulky and has a myriad of components. Accordingly, the procedure involves a very complex design and high costs.

SUMMARY

According to one aspect, a valve setup or assembly is provided. The assembly comprises:
- a valve cassette block comprising a plurality of valves which are controllable via a control surface of the valve cassette block;
- a valve control block having an operation surface, the valve control block being configured to (selectively) control (e.g. open and close) each of the plurality of valves when the operation surface is in close contact with the control surface of the valve cassette block in an operation position;
- at least one swiveling door hinged to the valve control block such that an open state of the swiveling door allows arranging the valve cassette block into the operation position with its control surface arranged at the operation surface of the valve control block, while a closed position of the swiveling door is configured to hold the valve cassette block in the operation position with an inner surface of the swiveling door abutting a rear surface of the valve cassette block opposite to its control surface; and
- at least one flexible pressurizing tube arranged at the inner surface of the swiveling door such that the pressurizing tube presses against the rear surface of the valve cassette block, when the pressure in the pressurizing tube is increased.

In one example the valve cassette block may comprise a plurality of fluid connectors arranged along its peripheral edge (in a view perpendicular to the control surface and the rear surface), The fluid connectors may be adapted to connect external fluid conduits. The plurality of fluid connector may include both inlet and outlet connectors. The at least one swiveling door may be hinged to the valve control block via a hinge arranged at a portion of the peripheral edge of the valve control block, which does not overlap with any of the plurality of fluid connectors (or with straight extensions of the fluid connectors along their connection directions, where the external conduits might be connected) in a view/projection perpendicular to the operation surface, when the assembly is in an operation state, i.e. when the valve cassette block is in the operation position. This allows a very convenient mounting of the valve cassette block, since the fluid connectors or any conduits connected thereto collide with the hinge when mounting the valve cassette block to the valve control block. Specifically, with this arrangement, when the at least one swiveling door is open, the peripheral edge of the valve control block can be kept free at the portions where the fluid connectors of the valve cassette block are arranged.

In some examples, the at least one swiveling door may comprise at least a pair of swiveling doors, that are symmetrically hinged to the valve control block, e.g. either rotationally symmetrical and/or mirror symmetrical.

In some examples, the peripheral edge of the valve control block (and optionally also of the valve cassette block) may each define a rectangular shape. The at least one swiveling door may comprise two swiveling doors (i.e. a pair of swiveling doors) that are hinged to the valve control block via respective hinges that are arranged at opposing sides of the peripheral edge next to diagonally opposing corners, such as a left-side edge and right-side edge respectively, where the one is arranged next to the lower corner and the other one is arranged next to the upper corner of the respective edge side. Each of these hinges extends along the respective edge (e.g. the left or right edge) not more than half of the respective edge (i.e. not beyond the middle of the respective edge). The swivel axes may be parallel to these edges (i.e. parallel to the respective sides of the rectangular shape). Each of the swiveling doors of the pair of swiveling doors may cover about half of the rear surface of the valve cassette block when mounted, e.g. an upper half and a lower half respectively. With vertical swivel axes, the swiveling doors can swivel horizontally, which makes it rather easy to handle, since they can stay in any position (without requiring extra fixation) while mounting the valve cassette block. Moreover, this arrangement leaves both the bottom and top edge of the assembly as well as half of each of the left and right edges free for fluid connectors of the valve cassette block.

In some examples, the peripheral edge of the valve control block (and optionally also of the valve cassette block) may each define a rectangular shape. The at least one swiveling door may comprise two swiveling doors (i.e. a pair of swiveling doors) that are hinged to the valve control block via respective hinges that are arranged at two (e.g. neighboring) corners of the peripheral edge, such as a lower left and a lower right corner or an upper left and an upper right corner. The swivel axes may lie 45° with respect to the edge between the two neighboring corners (of the rectangular shape), which might be the lower edge in one example. Such corner swiveling doors leave most of the periphery of the assembly free for fluid connectors of the valve cassette block. Since the corner swiveling doors might cause that the doors do not swivel horizontally, but at least partially also with a vertical component, counter-balance (gas) springs might support swiveling movement against gravity.

In some examples, the at least one swiveling door may be lockable in the closed state by means of a latching mechanism arranged at an end portion of the swiveling door opposite to an end portion where the swiveling door is hinged to the valve control block. This latching mechanism support the swiveling door to reliably stay in the closed state even when pressure is exerted via the pressurizing tube, while being easy to handle.

In some examples the inner surface of the least one swiveling door may comprise at least one tube accommodation channel formed as a recess to accommodate the at least one pressurizing tube. In some examples, the at least one pressurizing tube may comprise a plurality of parallel (e.g. equidistantly arranged) pressurizing tubes. In some examples the at least one pressurizing tube may be adapted to be pressurized with air. However, any gas or also liquid might be possible.

According to another aspect, a method for assembling a valve setup or assembly is provided. The method comprises:
  providing a valve cassette block comprising a plurality of valves which are controllable via a control surface of the valve cassette block;
  providing a valve control block having an operation surface, the valve control block being configured to (selectively) control (e.g. open and close) each of the plurality of valves when the operation surface is in close contact with the control surface of the valve cassette block in an operation position, the valve control block comprising at least one second positioning component and a pair of hinge arms;
  providing at least one swiveling door hinged to the valve control block such that an open state of the swiveling door allows arranging the valve cassette block into the operation position with its control surface arranged at the operation surface of the valve control block, while a closed position of the swiveling door is configured to hold the valve cassette block in the operation position with an inner surface of the swiveling door abutting a rear surface of the valve cassette block opposite to its control surface;
  providing at least one flexible pressurizing tube arranged at the inner surface of the swiveling door such that the pressurizing tube presses against the rear surface of the valve cassette block, when the pressure in the pressurizing tube is increased.
  in the open state of the at least one swiveling door, mounting the valve cassette block in the operation position;
  locking the at least one swiveling door in the closed state, with the valve cassette block in the operation position; and
  pressurizing the at least one pressurizing tube such that it presses against the rear surface of the valve cassette block, thereby pushing the valve cassette block with its control surface against the operation surface of the valve control block.

In one example, pressurizing the at least one pressurizing tube may comprise filling the at least one pressurizing tube with compressed air. However, any gas or also liquid might be possible.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

The following description relates to an assembly that constitutes a valve setup for use in a SMB chromatographic separation process. The chromatographic separation process may be performed exemplarily to purify recombinant protein products, or monoclonal antibodies, or viral vectors, or DNA products.

Figure 1:
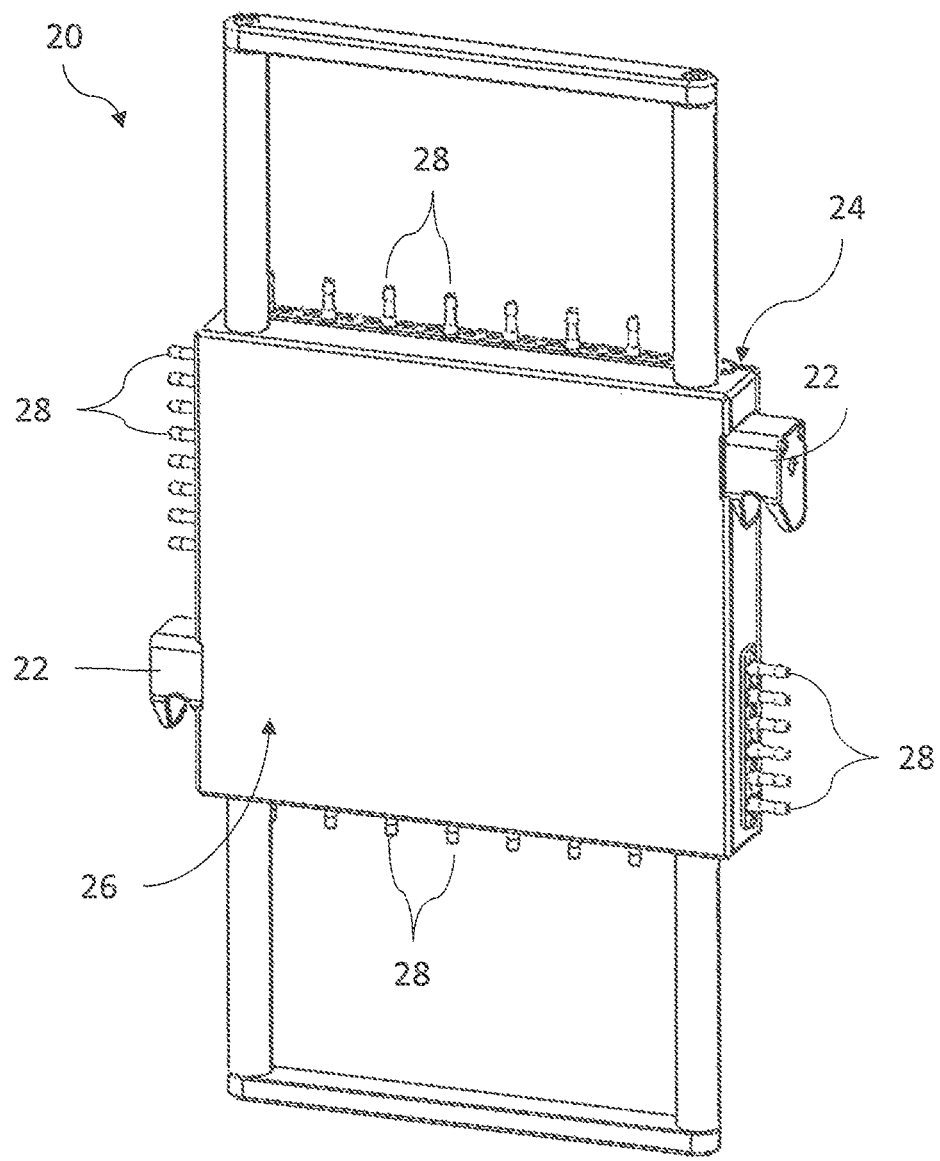
FIG. 1 shows an example of a valve cassette block.
Figure 2A:
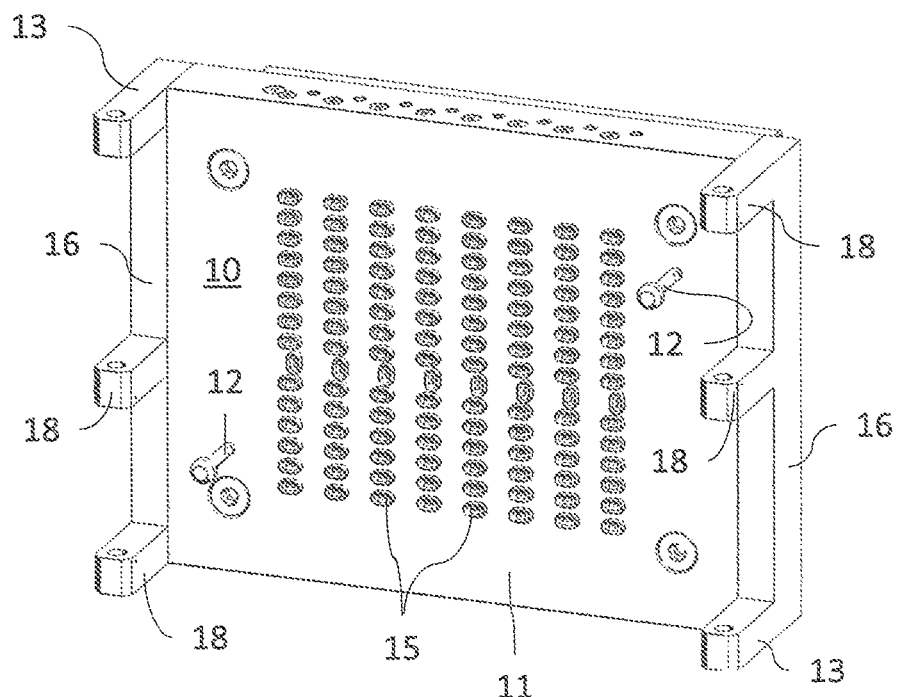
FIGS. 2a and 2b show examples of a valve control block.
Figure 2B:
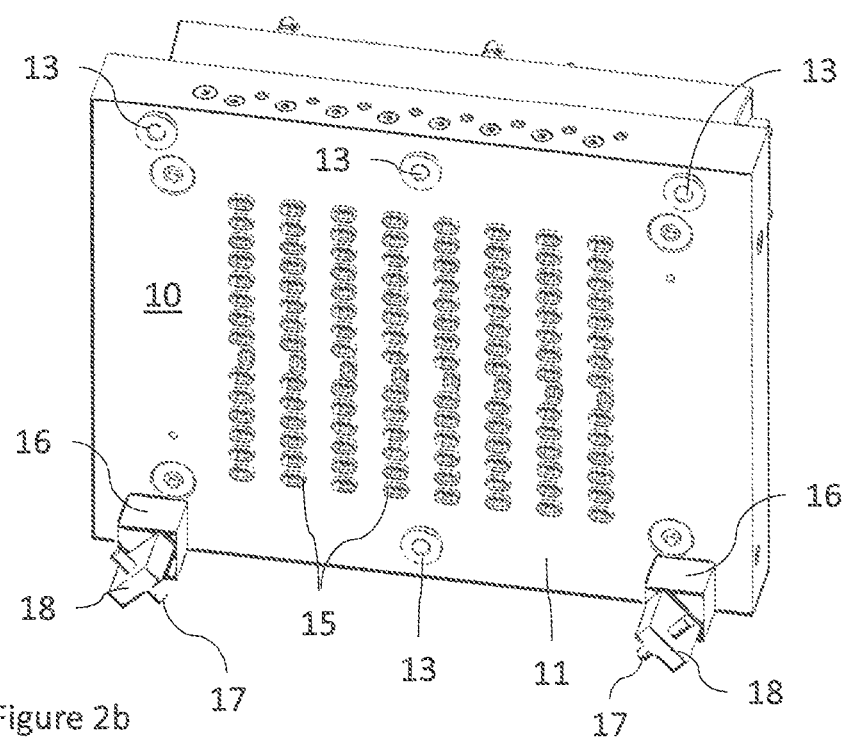

The assembly comprises two blocks, a valve cassette block comprising a plurality of valves and a valve control block that controls the plurality of valves. FIG. 1 shows an example of a valve cassette block 20 and FIGS. 2a and 2b show examples of a valve control block 10.

The valve cassette block 20 comprises a plurality of valves 25 (not shown in FIG. 1), e.g. membrane or diaphragm valves. The valves 25 are accessible for being controlled (e.g. switched between an open and a closed state, or between a connected and a disconnected state) via a control surface 24 of the valve cassette block 20. In the example of FIG. 1, the control surface 24 is on the far side, opposite to a rear surface 26 of the valve cassette block 20. The plurality of valves might be arranged in a regular array along the control surface 24. Each of the valves might be addressed (controlled) separately from the other valves, for example.

The valve control block 10 comprises a plurality of control elements 15 arranged at an operation surface 11 of the valve control block 10 for controlling the valves 25 in the valve cassette block 20, for example a plurality of solenoids, wherein each solenoid is configured to control (open/close) a respective valve 25, when the control surface 24 of the valve cassette block 20 is in close contact with the operation surface 11 of the valve control block 10. Accordingly, the valve cassette block 20 may comprise n valves 25 and the valve control block 10 may comprise n control elements 15, e.g. including solenoids.

The control surface 24 may be a substantially flat surface of the valve cassette block 20. Similarly, the operation surface 11 may be a substantially flat surface of the valve control block 10. The arrangement of the valves 25 on the valve cassette block 20 may conform to the arrangement of the control elements on the valve control block 10 so that it is possible to bring each valve 25 in correspondence of its respective control element 15 when placing the valve cassette block 20 next to the valve control block 10. Exemplarily, the plurality of valves 25 (and, similarly, the control elements 15) may be arranged according to a grid comprising rows and columns. However, the skilled person in the art will readily understand that alternative arrangement are also possible.

Figure 3A:
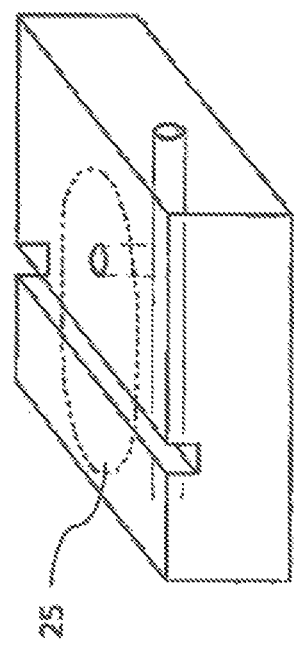
FIG. 3a shows a portion of an exemplary valve cassette block comprising a valve and channels.

The valve cassette block 20 comprises a plurality of channels that may be connected or disconnected by actuating the valves 25. FIG. 3a shows a cut-out portion of the valve cassette block 20 comprising a membrane valve 25 and two channels in orthogonal directions to each other. The structure of the valve cassette block 20 may comprise a plurality of portions such as the one shown in FIG. 3a, in order to provide a manifold of valves 25 and interconnectable conduits that form a flow path.

Figure 3B:
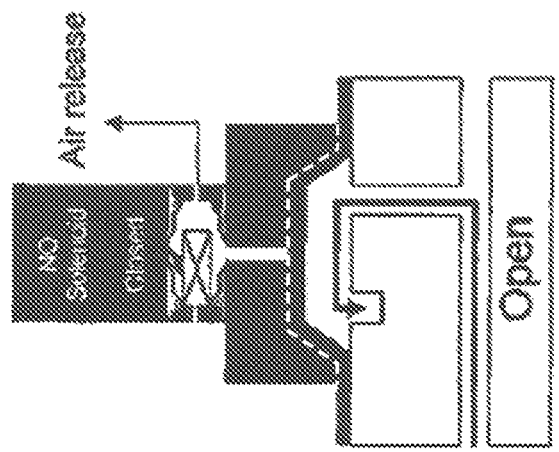
FIG. 3b shows a functioning of an exemplary valve.
Figure 3B:
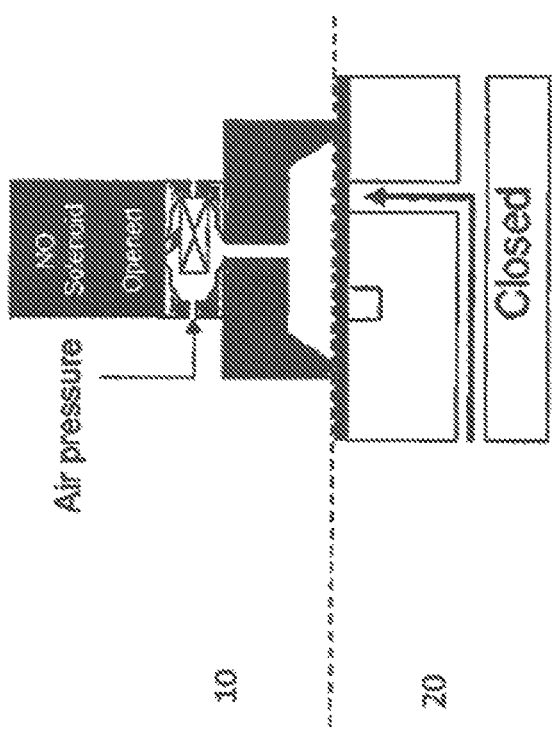

FIG. 3b shows a functioning of an exemplary membrane valve 25 in the valve cassette block 20 controlled by a corresponding solenoid in the valve control block 10. In particular, the valve control block 10 may further comprise a plurality of air chambers, each associated to a corresponding solenoid, so that the solenoid acts as pneumatic actuator for the corresponding valve 25. An air chamber may comprise one or more cavities, e.g. one cavity on the surface of the valve control block 10 configured to receive the membrane valve. The air chamber may further comprise a cavity serving as an inlet and an outlet for air passage.

For example, the solenoid may be a normally open (NO) solenoid, which implies that the membrane valve is normally closed (left-hand side of FIG. 3b). When the solenoid switches from open to closed, it removes the air pressure on the membrane valve, which then opens, connecting the conduits in the valve cassette block 20 (right-hand side of FIG. 3b).

In other words, the valve control block 10 and the valve cassette block 20 cooperate to switch flow paths and, thus, connections to inlets for feed and solvent as well as outlets. The valve control block 10 and valve cassette block 20 are formed separately and are subsequently mechanically joined to form the operational position. One advantage of this configuration is that the valve control block 10 may be a permanent (i.e. re-usable) component of the chromatography system and the valve cassette block 20 may be a single-use component.

The dashed line on the left-hand side of FIG. 3b shows the interface between the valve control block 10 and the valve cassette block 20. In order to ensure a correct functioning of the valve setup, the valve control block 10 and the valve cassette block 20 must be in airtight contact with each other. To this purpose, a combination of swiveling doors and pressurizing tube arrays as described below may be used.

Going back to FIG. 1, the valve cassette block 20 may further comprise at least one first positioning component 22. Exemplarily, the valve cassette block 20 may comprise two first positioning components 22. Further details about the at least one first positioning component 22 will be provided below.

The valve cassette block 20 may comprise inlet and outlet connectors 28 for connecting to external components, e.g. chromatography columns or membrane devices or collection vessels. In particular, the valve cassette block may comprise two sets of inlets and outlets. One set of inlets and outlets may provide fluid connection for buffer and feed streams, elution and/or wash fractions. Another set of inlet and outlet connectors may connect the valve cassette block with inlet and outlet ports of the chromatographic columns/membrane adsorbers. Exemplarily, the valve cassette block 20 may comprise a unitarily formed central body (made of e.g. plastic such as acrylic resin) on which the valves 25 are located and one or more components connected to the central body, such as the at least one first positioning component 22 and the inlet/outlet connectors 28 (fluid connectors).

In particular, the inlet and outlet connectors 28 may be located laterally with respect to the valves, e.g. on the sides of the central body. For example, the central body may substantially have the shape of a cuboid in which the pair of opposite surfaces having the largest extensions comprises the rear surface 26 and the control surface on which the valves 25 are located. The inlet/outlet connectors 28 may be located on one or more of the remaining (four) side surfaces.

Exemplarily, if the valves 25 are arranged in a grid having x columns and y rows, there may be one inlet/outlet connector 28 for each row and one inlet/outlet connectors 28 for each column. Accordingly, each side surface extending parallel to the rows may have x inlet/outlet connectors 28 corresponding to the positions of the columns, while the side surfaces extending parallel to the columns may have a total of y inlet/outlet connectors 28 corresponding to the positions of the rows.

The valve cassette block 20 may further comprise a pair of handles located on two opposite side surfaces, e.g. along a second direction B with respect to the central body, the second direction B being perpendicular to the first direction A. The handles enable a comfortable and safe handling during transport and installation of the valve cassette block 20 to the valve control block 10.

Turning to FIGS. 2a and 2b, the valve control block 10 may comprise at least one second positioning component 12 and a pair of hinge arms 16. The at least one second positioning component 12 may be configured to cooperate with the at least one first positioning component 22 to link the valve cassette block 20 to the valve control block 10. In particular, the interplay between at least one second positioning component 12 and the at least one first positioning component 22 allows for a precise positioning of the valve cassette block 20 with respect to the valve control block 10. Specifically, the valves 25 are positioned in correspondence of the control elements 15.

Accordingly, the valve cassette block 20 can be positioned adjacent to the valve control block 10 by engaging the at least one first positioning component 22 with the at least one second positioning component 12. In particular, the substantially flat surface of the valve cassette block 20, i.e. the operation surface 24, on which the valves 25 are placed is in contact with the substantially flat surface of the valve control block 10 on which the control elements 15 are placed.

The at least one first positioning component 22 and the at least one second positioning component 12 may have complementary features that enable the valve cassette block 20 to be steadily but removably connected to the valve control block 10. Exemplarily, the features (e.g. shape) and/or location of the at least one first positioning component 22 and the at least one second positioning component 12 may be such that gravity keeps the valve cassette block 20 in place with respect to the valve control block 10. Alternatively or additionally, the at least one first positioning component 22 and the at least one second positioning component 12 may interlock with each other to create a stable connection.

As mentioned above, the valve control block 10 may further comprise a pair of hinge arms 16, i.e. two hinge arms. The hinge arms 16 may be formed unitarily with the valve control block 10 or attached thereto. Each hinge arm 16 is configured to provide a means for movably connecting a respective swiveling door to the valve control block 10.

Figure 4A:
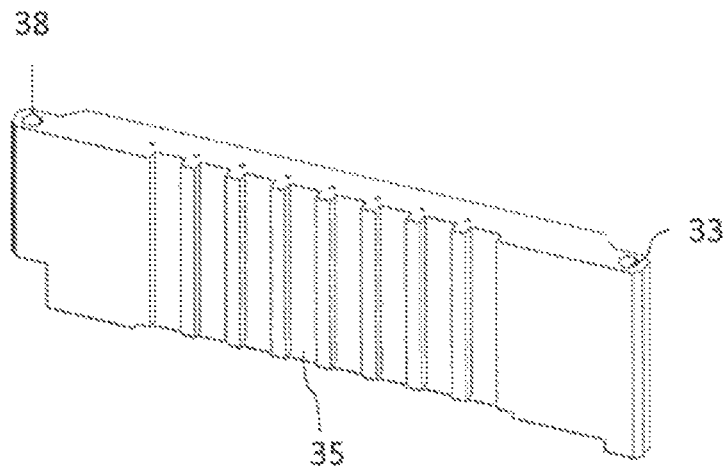
FIGS. 4a and 4b show examples of swiveling doors.
Figure 4B:
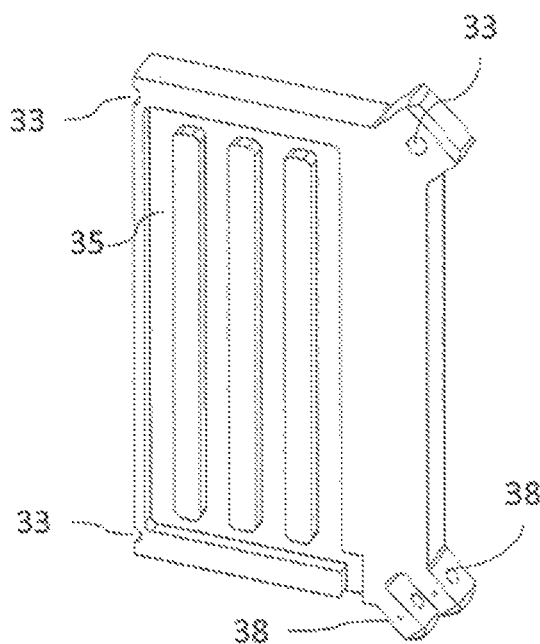

Indeed, the assembly may further comprise a pair of (i.e. two) swiveling doors 30, each swiveling door 30 being hinged to the valve control block 10 with respective hinges, i.e. via the hinge arms 16. FIGS. 4a and 4b show examples of swiveling doors 30. The swiveling door 30 of FIG. 4a may be configured to be connected to the hinge arm 16 of FIG. 2a (first example), while the swiveling door 30 of FIG. 4b may be configured to be connected to the hinge arm 16 of FIG. 2b (second example).

Due to the hinged connection each swiveling door 30 can be opened and closed with a respective swiveling movement around the respective hinge axis. Any pivoting mechanism may be employed in the hinges. Each hinge may have a respective hinge pin 17, which connect a block knuckle 18 formed in the respective hinge arm of the valve control block with a respective door knuckle 38 of the swiveling door 30, and define the hinge axis.

Each swiveling door 30 is hinged to the valve control block 20 such that the open state of the swiveling door 30 allows arranging the valve cassette block 20 into the operation position with its control surface 24 arranged at the operation surface 11 of the valve control block. When the swiveling door 30 is brought to its closed position, it holds the valve cassette block in the operation position with an inner surface of the swiveling door 30 abutting a rear surface 26 of the valve cassette block 20. Accordingly, the valve cassette block 20 may be sandwiched between the swiveling door 30 and the valve control block 10, as will be shown in further detail with reference to FIGS. 8a and 8b. When the swiveling doors are closed, they may (together) cover at least 50%, or at least 75%, or even at least 90% of the rear surface 26 of the valve cassette block. In some examples they may even cover substantially the whole rear surface 26. Accordingly, pressure can be exercised over most or all over the valve cassette block 20.

Figure 5A:
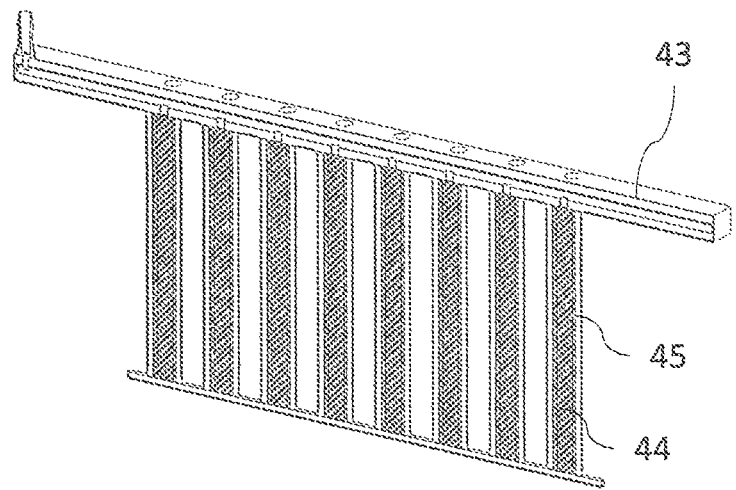
FIGS. 5a and 5b show examples of pressurizing tube arrays.
Figure 5B:
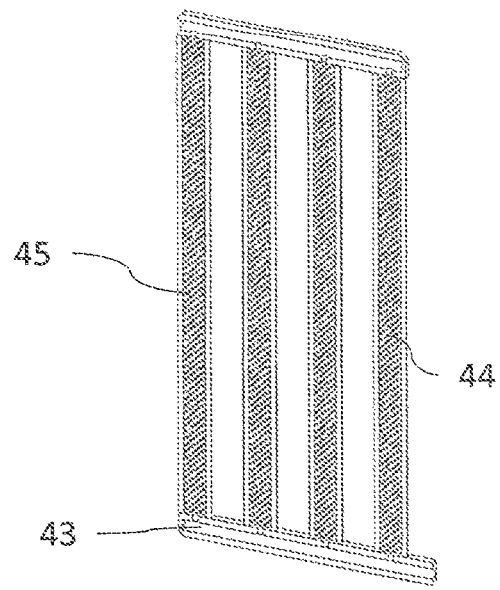

Each swiveling door 30 may comprise at least one tube accommodation channel 35, which is configured to receive at least part of a pressurizing tube array 40, examples of which are shown in FIGS. 5a and 5b. The swiveling door 30 of FIG. 4a may be configured to receive the pressurizing tube array 40 of FIG. 5a (first example), while the swiveling door 30 of FIG. 4b may be configured to receive the pressurizing tube array 40 of FIG. 5b (second example).

The pressurizing tube array 40 may comprise a plurality of pressurizing tubes 45 and at least one supply conduit 43, which links the pressurizing tubes 45 to one another and is adapted to supply fluid pressure to the pressurizing tubes 45. Specifically, the supply conduit 43 may be configured to be connected to an external pressurized air supplier and to let the pressurized air into the pressurizing tubes 45. A pressurizing tube 45 is a tube configured to expand when pressurized air flows into it. In particular, the pressurizing tube 45 may be configured to expand in its thickness direction or to change its shape from the compressed to an expanded shape when being pressurized.

Exemplarily, and as shown in FIGS. 5a and 5b, the pressurizing tubes 45 may comprise a braided tube wall, made e.g. of metal or plastic, and a filling made of open cell foam, e.g. polyurethane foam 44. The air pressure for inflating the pressurizing tubes 45 may be between about 4 bar and about 10 bar, preferably between about 5 bar and about 8 bar, more preferably about 6 bar. For example, the number of pressurizing tubes 45 may be equal to the number of columns in the grid of valves 25.

The tube accommodation channels 35 may comprise at least one recess in the swiveling door 30, in particular the one or more recesses may be located on the inner surface of the swiveling door 30. In other words, there may be one or more depressions in the inner surface. A pressurizing tube array 40 is at least partly inserted in the tube accommodation channels 35 of a respective swiveling door 30. In particular, at least the plurality of pressurizing tubes 45 are inserted in the tube accommodation channels 35.

Considering the level of the inward main surface as reference, the tube accommodation channels 35 may have a depth corresponding to 1.5 times the thickness of the compressed pressurizing tubes 45, so that, when the compressed pressurizing tubes 45 are inserted in the tube accommodation channels 35, they are substantially flush with the inward main surface of the swiveling door 30. Conversely, once the pressurizing tubes 45 are inflated by the pressurized air, they protrude beyond the level of the inward main surface.

Figure 6A:
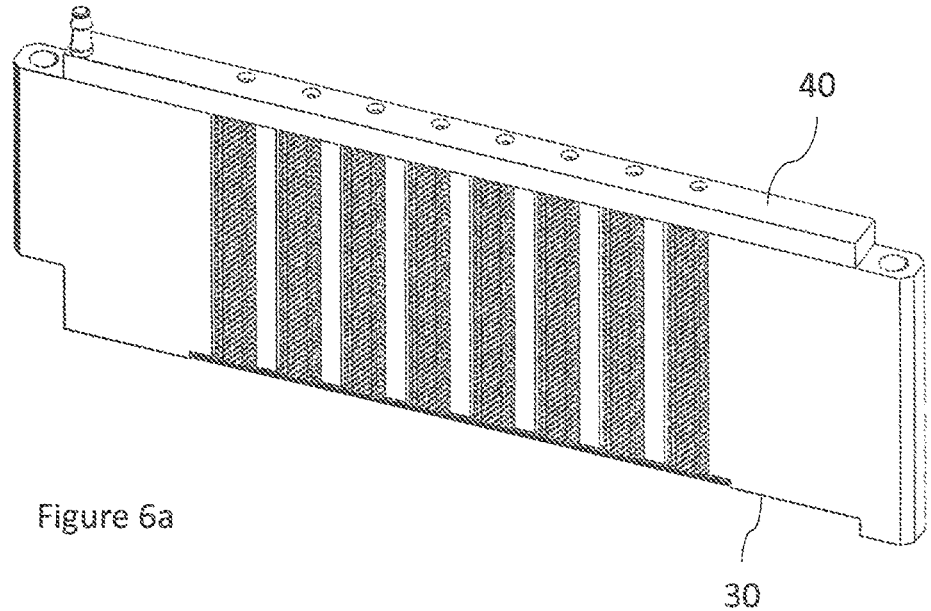
FIGS. 6a and 6b show examples of combinations of swiveling doors and pressurizing tube arrays.
Figure 6B:
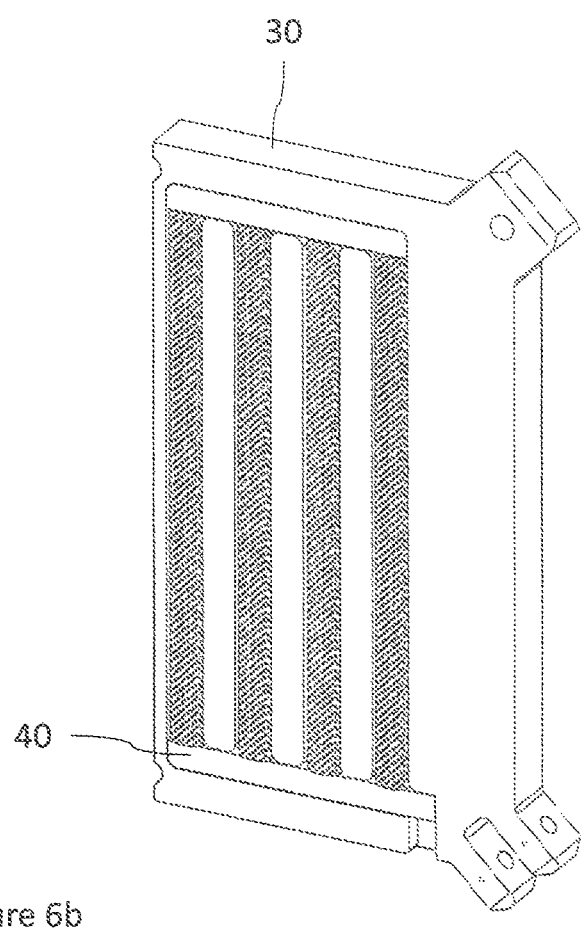

The combination of each swiveling door 30 and the respective embedded pressurizing tube array 40 may be denoted as "pressurizing door". FIGS. 6a and 6b show examples of pressurizing doors.

Figure 7A:
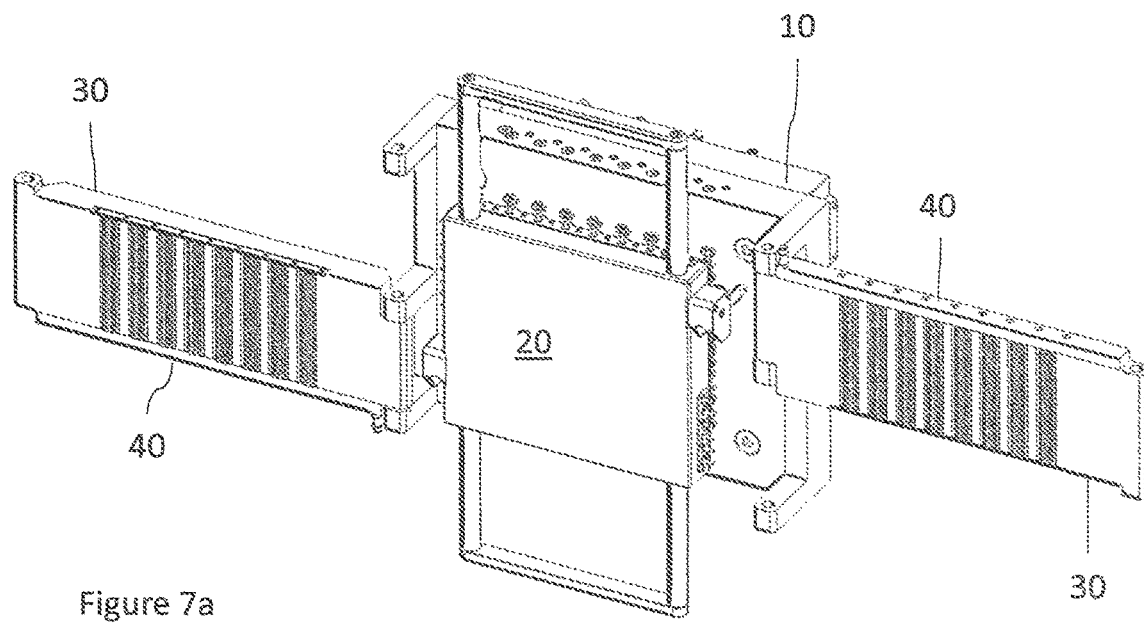
FIGS. 7a and 7b show examples of partially assembled valve setups.
Figure 7B:
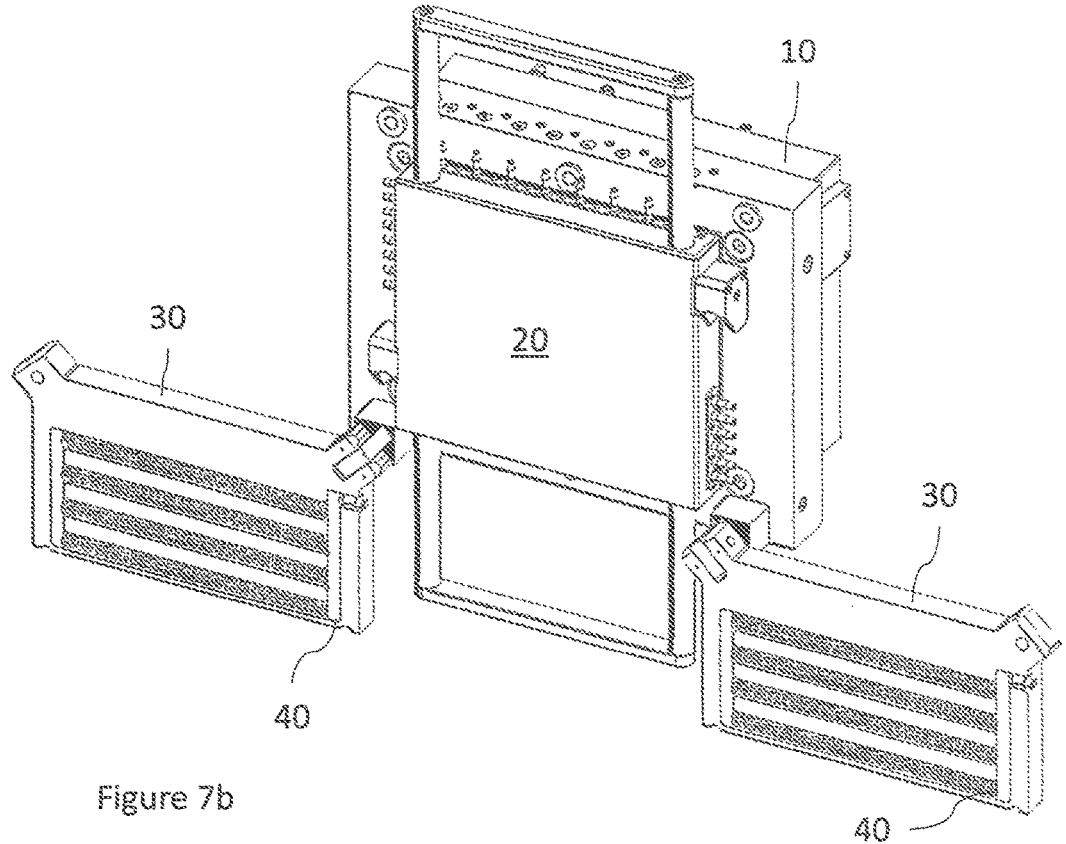

FIGS. 7a and 7b show examples of partially assembled valve setups comprising the elements described heretofore, wherein the pressurizing doors are in an open state. Exemplarily, the valve cassette block 20 may be joined to the valve control block 10 in this open configuration.

As can be seen, the valve cassette block 20 in this example comprises a plurality of fluid connectors 28 (specifically shown in FIG. 1) arranged along its peripheral edge (in a view perpendicular to the control surface 24 and the rear surface 26), The fluid connectors 28 are adapted to connect external fluid conduits. The plurality of fluid connector 28 include both inlet and outlet connectors. In both examples of FIGS. 7a and 7b, two (symmetrically arranged) swiveling doors 30 are used In the example of FIG. 7a, the height of each swiveling door 30 is about half of the height of the valve cassette block 20. In particular, the two swiveling doors 30 according to this first example are horizontally adjacent to each other in the closed state. In the example of FIG. 7b, the width of each swiveling door 30 is about half of the width of the valve cassette block 20. In particular, the two swiveling doors 30 according to this second example are vertically adjacent to each other in the closed state.

In both examples, the swiveling doors 30 are hinged to the valve control block 10 via a respective hinge that is arranged at a portion of the peripheral edge of the valve control block 10, which does not overlap with any of the plurality of fluid connectors (or with straight extensions of the fluid connectors along their connection directions, where the external conduits might be connected) in a view/projection perpendicular to the operation surface, when the assembly is in an operation state, i.e. when the valve cassette block is in the operation position. This allows a very convenient mounting of the valve cassette block, since the fluid connectors or any conduits connected thereto do not collide with the hinge when mounting the valve cassette block to the valve control block. Specifically, with this arrangement, when the at least one swiveling door is open, the peripheral edge of the valve control block can be kept free at the portions where the fluid connectors of the valve cassette block are arranged.

In both examples the swiveling doors are symmetrically hinged to the valve control block, e.g. either rotationally symmetrical (first example) and/or mirror symmetrical (second example).

More specifically, the peripheral edge of the valve control block (and also of the valve cassette block) in at least these two examples define a rectangular shape. In the first example, the hinges are arranged at opposing sides of the peripheral edge next to diagonally opposing corners, namely at the left side next to the lower corner and at the right side next to the upper corner. Each of these hinges extends along the respective edge not more than half of the respective edge (i.e. not beyond the middle of the respective edge). The swivel axes are parallel to these edges and thus vertical in the assembly. Each of the swiveling doors 30 covers about half of the rear surface of the valve cassette block, when closed, namely the upper half and the lower half, respectively. With vertical swivel axes, the swiveling doors swivel horizontally, which makes it rather easy to handle, since they can stay in any position (without requiring extra fixation) while mounting the valve cassette block. Moreover, this arrangement leaves both the bottom and top edge of the assembly as well as half of each of the left and right edges free for fluid connectors of the valve cassette block.

In the second example, the hinges are arranged at the two lower corners of the peripheral edge or optionally at the two upper corners of the peripheral edge. The swivel axes are oriented with about 45° relative to the lower edge, and thus about 45° relative to the horizontal. Such corner swiveling doors leave most of the periphery of the assembly free for fluid connectors of the valve cassette block. Since the corner swiveling doors cause that the doors do not swivel horizontally, but at least partially also with a vertical component, counter-balance (gas) springs might support swiveling movement against gravity.

Figure 8A:
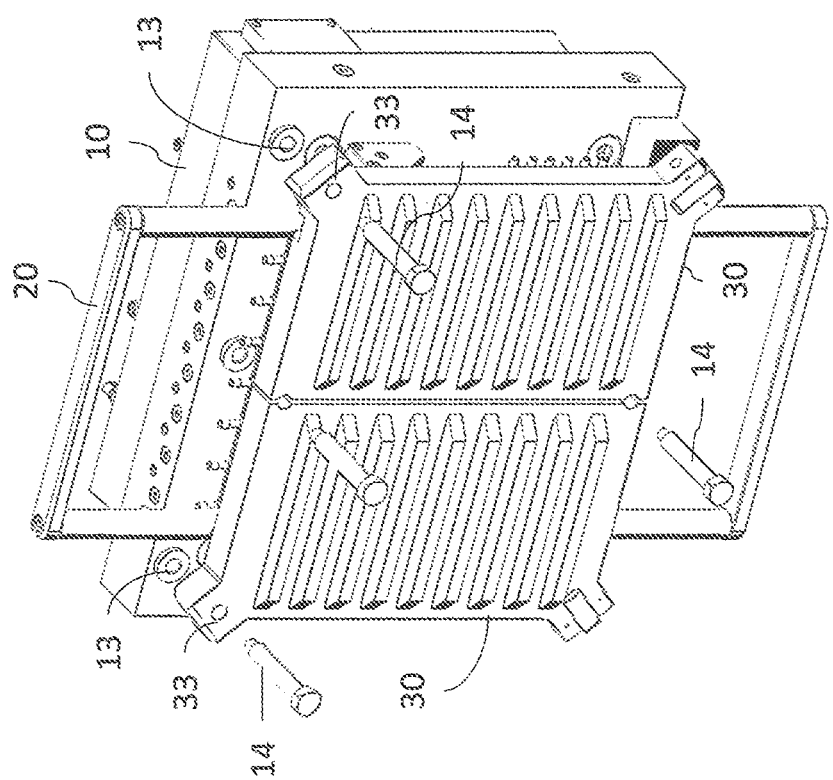
FIGS. 8a and 8b show examples of almost completely assembled valve setups.
Figure 8B:
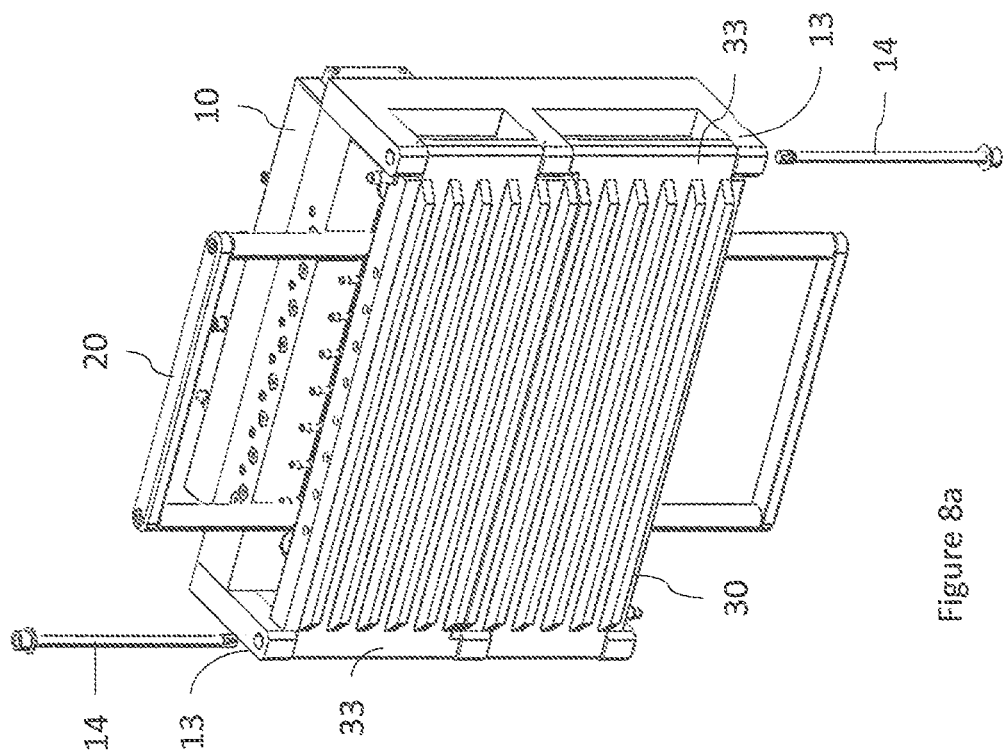

In order to press the valve cassette block 20 against the valve control block 10, the swiveling doors 30 are brought in the closed state so that the pressurizing tube(s) is/are in contact with the rear surface of the valve cassette block 20. FIGS. 8a and 8b show examples of almost fully assembled valve setups, in which the swiveling doors 30 are closed. The valve cassette block 20 is sandwiched between the valve control block 10 on one side and the pair of pressurizing doors on the other side. Exemplarily, the whole control surface of the valve cassette block 20 with the valves 25 may be adjacent to the operation surface of the valve control block 10 with the control elements 25. Similarly, the whole rear surface of the valve cassette block 20 may be adjacent to the inner surfaces of the swiveling doors 30 and the pressurizing tubes 45 inserted therein.

Once the valve cassette block 20 is enclosed by the swiveling doors 30, each swiveling door 30 may be locked by a latching mechanism so that the doors stay stably closed during pressurizing the tubes. In particular, it may prevent the swiveling doors 30 moving away, especially when the pressurizing tubes 45 are inflated. Accordingly, the valve control block 10 may comprise a plurality of block-sided bolt holes 13 and each swiveling door 30 may comprise at least one door-sided bolt hole 33, and the at least one door-sided bolt hole 33 may be configured to be fastened to a respective block-sided bolt hole 13 of the plurality of block-sided bolt hole 13. Exemplarily, each door-sided bolt hole 33 may be fastened to a block-sided bolt hole 13 by a latch bolt 14. Thus, the valve setup in its fully assembled state may comprise also a plurality of latch bolts 14.

The skilled person will readily be able to identify alternative designs to fasten and lock the valve cassette to the control block including different block hole arrangements. Just as another example, it is also possible to have a door fastening design similar to the bolting arrangement described in the "another example" below (related to FIGS. 2b, 4b and 5b). This design may use four block-sided bolt holes similar to 13 and four swivel door-sided bolt holes.

In another example (e.g. as in FIGS. 2b, 4b and 8b), the valve control block 10 may comprise a plurality of block-sided bolt holes 13 (e.g. four), and each swiveling door 30 may comprise a plurality of door-sided bolt holes 33 (e.g. four). Each block-sided bolt hole 13 may comprise a hole in the surface of the valve control block 10 (having the control elements 15 thereon) and each door-sided bolt hole 33 may comprise a hole in the swiveling door 30. The assembly may further comprise a plurality of latch bolts 14 (e.g. four).

Two of the block-sided bolt hole 13 may be located at the upper corners of the valve control block 10, a third one may be located at a middle point between the first two and a fourth block-sided bolt hole 13 may be located vertically in line with the third one but in the lower part of the valve control block 10. In other words, the fourth block-sided bolt hole 13 may be located at a middle point between the two hinge arms 16. In other examples (not shown) the number and arrangement of block-sided bolt holes 13 may be different.

Figure 9A:
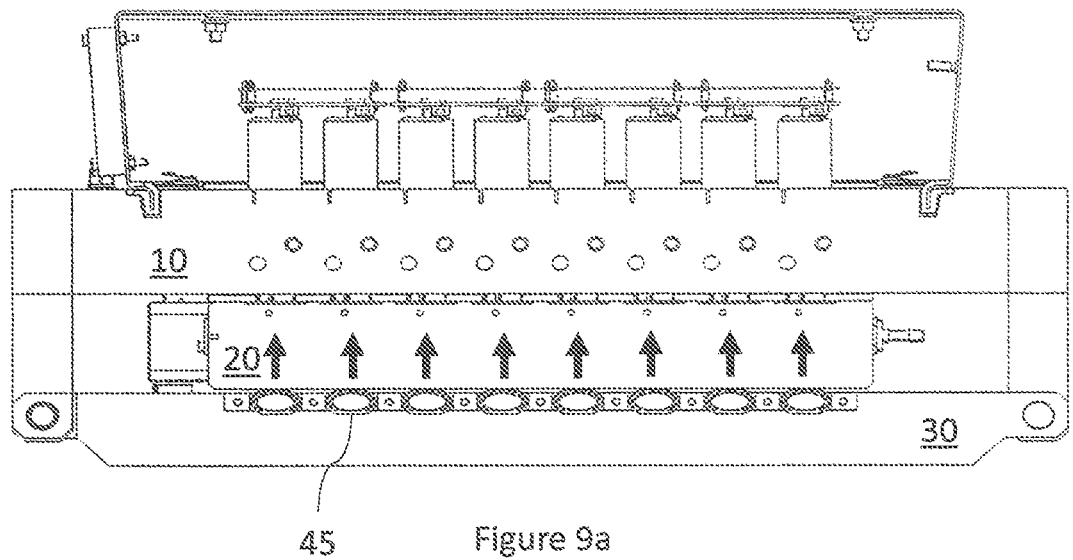
FIGS. 9a and 9b show exemplary cross sections of valve setups.
Figure 9B:
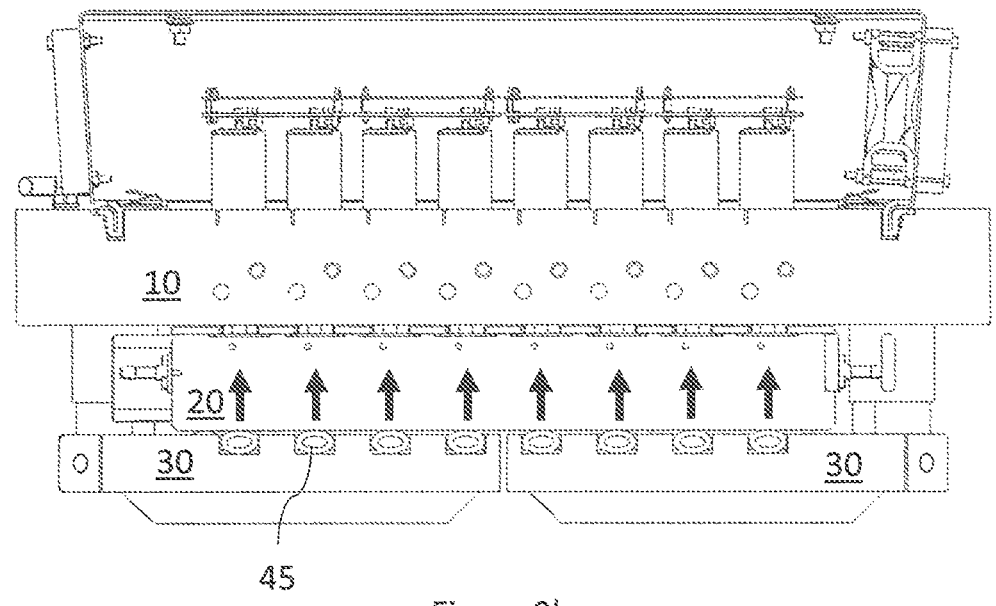

As can be seen from the figures, in these examples the latching mechanism is at least partly arranged at an end portion of the swiveling door opposite to an end portion where the swiveling door is hinged to the valve control block. This latching mechanism supports the swiveling door to reliably stay in the closed state even when pressure is exerted via the pressurizing tube, while being easy to handle. Moreover, the outer surface of the swiveling doors 30 comprises a plurality of ridges to stabilize the swiveling doors 30 with an increased stiffness When the valve setup is assembled, in that the valve cassette block 20 is in between the valve control block 10 and the swiveling doors 30, the pair of pressurizing tube arrays 40 is filled with pressurized air and pushes the valve cassette block 20 against the valve control block 10. In particular, the pressurizing tubes 45 of the pressurizing tube arrays 40 may be inflated to push the valve cassette block 20 against the valve control block 10. FIGS. 9a and 9b show exemplary cross sections of assembled valve setups. As explained, the pressurizing tubes 45 are configured to expand when pressurized air flows into them and to exercise pressure on the valve cassette block 20, thereby bringing it in the needed airtight contact with the valve control block 10. Accordingly it is possible to adequately press the valve cassette block 20 against the valve control block 10 to provide a functioning valve setup. During operation, all tubes 45 might be compressed nearly flat, as schematically illustrated in FIGS. 9a and 9b. This increases the pressurized contact surface and thereby ensures the uniformity of the applied force. In one possible implementation, when the door is closed, it compresses/squeezes the tubes, such that an initially round shape of the tubes changes to an oval shape. Alternately, a custom tube may be employed that is already in the desired oval shape as shown.

The above described pneumatic method for installing the valve cassette block 20 (i.e. functionally connecting it to the valve control block 10) is simple, intuitive and requires minimal effort. In particular, the time for assembly is significantly reduced with respect to a conventional method in which screws are directly used to fix the valve cassette block 20 to the valve control block 10. Further, compared with a hydraulic mounting systems, the cost and complexity of the method are greatly reduced.

The invention claimed is:

1. An assembly comprising:
   a valve cassette block comprising a plurality of valves which are controllable via a control surface of the valve cassette block;
   a valve control block having an operation surface, the valve control block being configured to control each of the plurality of valves when the operation surface is in close contact with the control surface of the valve cassette block in an operation position;
   at least one swiveling door hinged to the valve control block such that an open state of the swiveling door allows arranging the valve cassette block into the operation position with its control surface arranged at the operation surface of the valve control block, while a closed position of the swiveling door is configured to hold the valve cassette block in the operation position with an inner surface of the swiveling door abutting a rear surface of the valve cassette block opposite to its control surface; and
   at least one flexible pressurizing tube arranged at the inner surface of the swiveling door such that the pressurizing tube presses against the rear surface of the valve cassette block, when the pressure in the pressurizing tube is increased.

2. The assembly according to claim 1, wherein the valve cassette block comprises a plurality of fluid connectors arranged along its peripheral edge and wherein the at least one swiveling door is hinged to the valve control block via a hinge arranged at a portion of a peripheral edge of the valve control block, which does not overlap with any of the plurality of fluid connections in a view perpendicular to the operation surface.

3. The assembly according to claim 1, wherein the at least one swiveling door comprises at least a pair of swiveling doors, that are symmetrically hinged to the valve control block.

4. The assembly according to claim 1, wherein a peripheral edge of the valve control block defines a rectangular shape and wherein the at least one swiveling door comprises two swiveling doors that are hinged to the valve control block via respective hinges that are arranged at opposing sides of the peripheral edge next to diagonally opposing corners, and wherein each hinge extends along the respective edge not more than half of the respective edge and with the swivel axes being parallel to these edges.

5. The assembly according to claim 1, wherein a peripheral edge of the valve control block defines a rectangular shape and wherein the at least one swiveling door comprises two swiveling doors that are hinged to the valve control block via respective hinges that are arranged at two neighboring corners of the peripheral edge with the swivel axes lying 45° with respect to the edge between the two neighboring corner.

6. The assembly according to claim 1, wherein the at least one swiveling door is lockable in the closed state by means of a latching mechanism arranged at an end portion of the swiveling door opposite to an end portion where the swiveling door is hinged to the valve control block.

7. The assembly according to claim 1, wherein the inner surface of the least one swiveling door comprises at least one tube accommodation channel formed as a recess to accommodate the at least one pressurizing tube.

8. The assembly according to claim 1, wherein the at least one pressurizing tube comprises a plurality of parallel pressurizing tubes.

9. The assembly according to claim 1, wherein the at least one pressurizing tube is adapted to be pressurized with air.

10. The assembly according to claim 1, wherein the at least one pressurizing tube comprises a filling made of open cell polyurethane foam.

11. A method for assembling a valve setup, the method comprising:
    providing a valve cassette block comprising a plurality of valves which are controllable via a control surface of the valve cassette block;
    providing a valve control block having an operation surface, the valve control block being configured to control each of the plurality of valves when the operation surface is in close contact with the control surface of the valve cassette block in an operation position, the valve control block comprising at least one second positioning component and a pair of hinge arms;
    providing at least one swiveling door hinged to the valve control block such that an open state of the swiveling door allows arranging the valve cassette block into the operation position with its control surface arranged at the operation surface of the valve control block, while a closed position of the swiveling door is configured to hold the valve cassette block in the operation position with an inner surface of the swiveling door abutting a rear surface of the valve cassette block opposite to its control surface;
    providing at least one flexible pressurizing tube arranged at the inner surface of the swiveling door such that the pressurizing tube presses against the rear surface of the valve cassette block, when the pressure in the pressurizing tube is increased;
    in the open state of the at least one swiveling door, mounting the valve cassette block in the operation position;
    locking the at least one swiveling door in the closed state, with the valve cassette block in the operation position; and
    pressurizing the at least one pressurizing tube such that it presses against the rear surface of the valve cassette block, thereby pushing the valve cassette block with its control surface against the operation surface of the valve control block.

12. The method of claim 11, wherein pressurizing the at least one pressurizing tube comprises filling the at least one pressurizing tube with compressed air.

* * * * *